United States Patent
Hsieh et al.

(10) Patent No.: US 8,068,553 B2
(45) Date of Patent: Nov. 29, 2011

(54) SYSTEM AND METHOD FOR EVALUATING PERFORMANCE OF A MIMO ANTENNA SYSTEM

(75) Inventors: Po-Chuan Hsieh, Taipei Hsien (TW);
Chun-Jen Chen, Taipei Hsien (TW);
Chien-Hung Liu, Taipei Hsien (TW);
Yu-Chang Pai, Taipei Hsien (TW);
Shou-Kuo Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 216 days.

(21) Appl. No.: 12/633,895

(22) Filed: Dec. 9, 2009

(65) Prior Publication Data
US 2011/0051793 A1 Mar. 3, 2011

(30) Foreign Application Priority Data
Aug. 25, 2009 (CN) .............................. 200910306071

(51) Int. Cl.
*H04L 7/02* (2006.01)
*H04B 7/02* (2006.01)

(52) U.S. Cl. ........ 375/267; 375/224; 375/295; 375/299; 455/101; 370/334

(58) Field of Classification Search .................. 375/267, 375/295, 224, 299; 455/101; 370/334
See application file for complete search history.

(56) References Cited

U.S. PATENT DOCUMENTS

| | | | | |
|---|---|---|---|---|
| 6,807,401 B2 * | 10/2004 | Boyle | ............................ | 455/101 |
| 7,359,734 B2 * | 4/2008 | Ylitalo | ........................ | 455/562.1 |
| 7,391,386 B2 * | 6/2008 | Sawaya et al. | ................. | 343/833 |

* cited by examiner

*Primary Examiner* — Ted Wang
(74) *Attorney, Agent, or Firm* — Altis Law Group, Inc.

(57) ABSTRACT

A performance evaluation system for a multiple-input multiple-output (MIMO) antenna system receives simulation parameters from an input device, and simulates a MIMO antenna system accordingly. A method, also provided, further evaluates performance of the simulated MIMO antenna system when a series of radio frequency (RF) signals are transmitted through the MIMO antenna system, and displays a performance analysis result of the MIMO antenna system on a display device for evaluation of the performance of the simulated MIMO antenna system.

19 Claims, 8 Drawing Sheets

US 8,068,553 B2

SYSTEM AND METHOD FOR EVALUATING PERFORMANCE OF A MIMO ANTENNA SYSTEM

BACKGROUND

1. Technical Field

Embodiments of the present disclosure relate generally to the technical field of multi-antenna systems in wireless communication technology, and more particularly to a system and method for evaluating performance of a multiple-input multiple-output (MIMO) antenna system.

2. Description of Related Art

With the demand for multimedia services of high quality using wireless communication technology, a next-generation wireless transmission technique has been required to deliver massive data at a higher rate with a lower error incidence. To respond to this, a multiple-input multiple-output (MIMO) antenna system has been suggested. The MIMO antenna system carries out the MIMO operation by arranging a plurality of antenna elements in a specific structure.

One challenge for practical implementation of the MIMO antenna system is the need for a receiver antenna that offers a suitable balance between complexity and performance. The maximum likelihood signal detecting method can be used to achieve the best performance in the MIMO antenna system, but increased complexity makes system performance evaluation impractical.

Accordingly, there is a need for an improved system and method for evaluating performance of a MIMO antenna system, so as to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
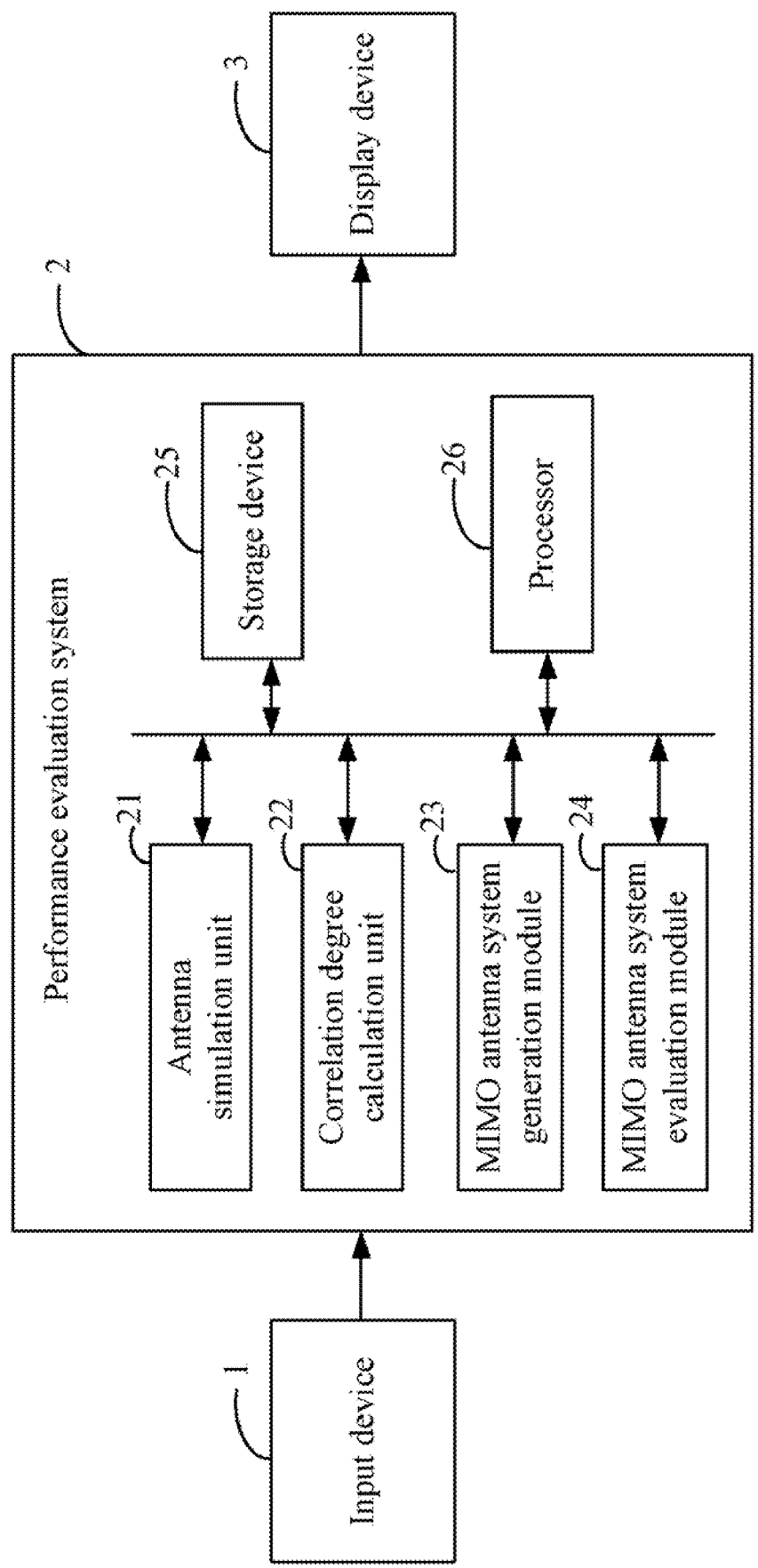
FIG. 1 is a schematic diagram of one embodiment of a performance evaluation system for a MIMO antenna system.

FIG. 1 is a schematic diagram of one embodiment of a performance evaluation system 2 for a multiple-input multiple-output (MIMO) antenna system. The performance evaluation system 2 is operable to simulate a MIMO antenna system, and evaluate performance of the simulated MIMO antenna system. The performance evaluation system 2 is connected to an input device 1 and a display device 3. The input device 1 is operable to input a plurality of simulation parameters to construct a multiple-antenna model. In one embodiment, the multiple-antenna model may include multiple antennas, such as one or more receiver antennas, and one or more transmission antennas. In one example with respect to FIG. 2, the multiple-antenna model 10 may include two antennas, such as a first antenna and a second antenna. The display device 3 is operable to display the multiple-antenna model and a performance analysis result of the MIMO antenna system during the performance evaluation process of the MIMO antenna system.

In one embodiment, the performance evaluation system 2 may include an antenna simulation module 21, a correlation degree calculation module 22, a MIMO antenna system generation module 23, and a MIMO antenna system evaluation module 24. The performance evaluation system 2 may further include a storage device 25, and at least one processor 26. One or more computerized codes of the function modules 21-24 may be stored in the storage device 25 and executed by the at least one processor 26. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

Figure 3A:
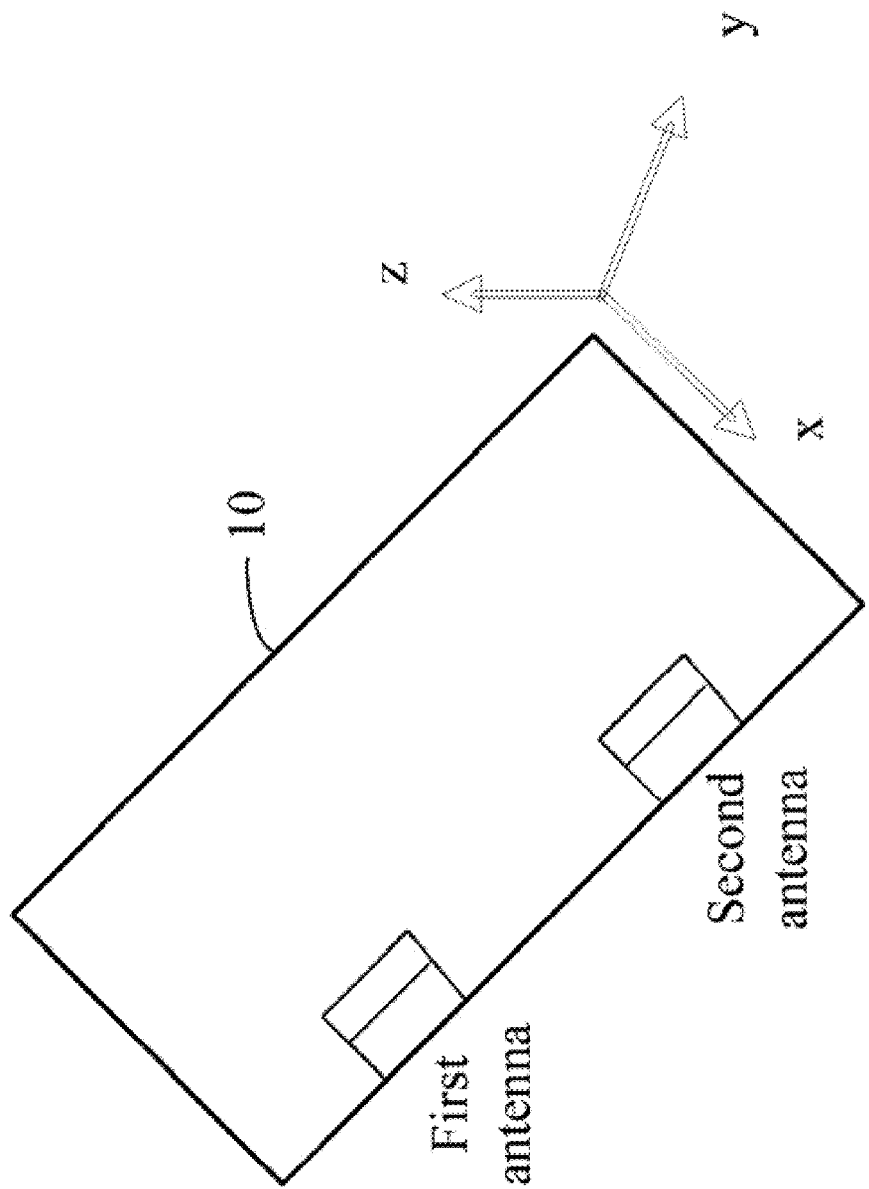
FIG. 3A-3B are schematic diagrams illustrating two examples of a multiple-antenna model.
Figure 3B:
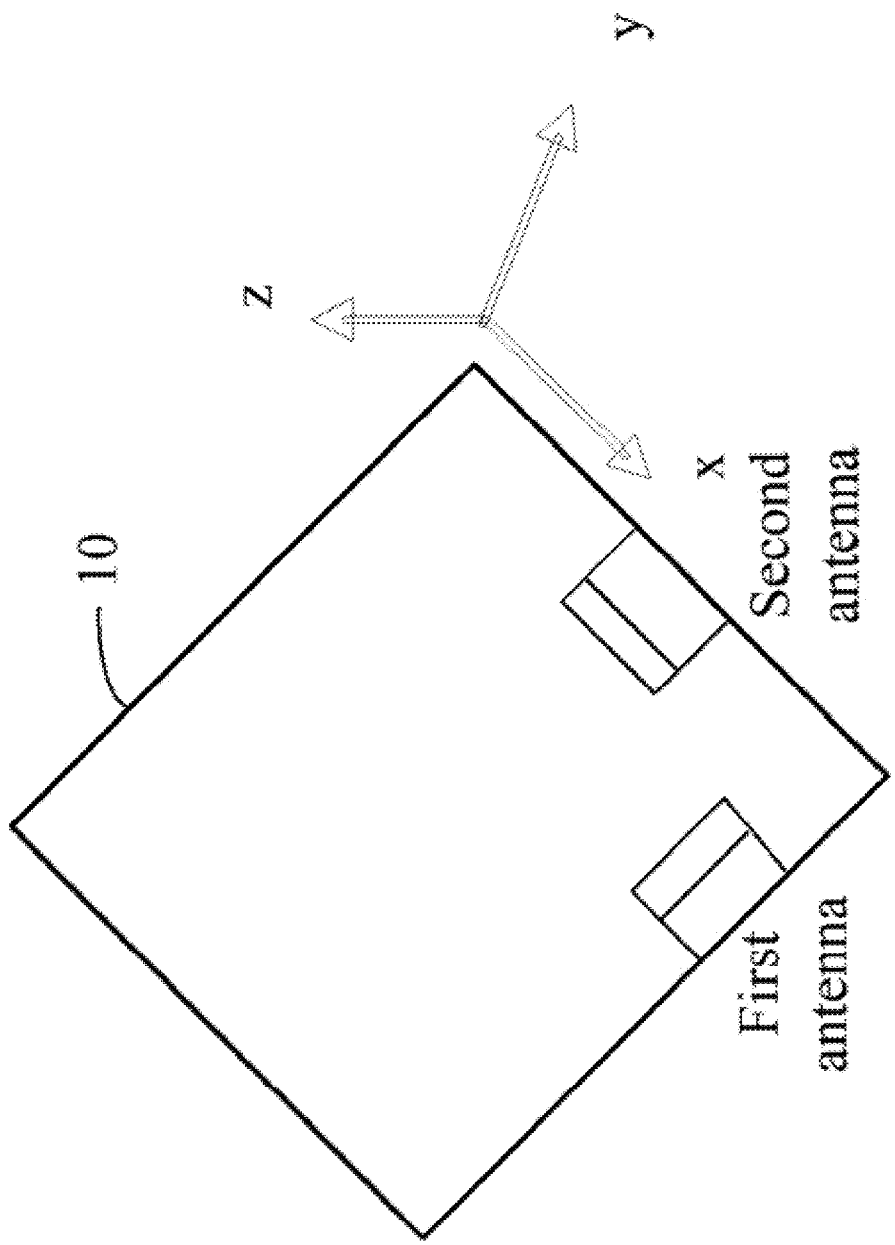

The antenna simulation module 21 is operable to receive a plurality of simulation parameters from the input device 1, and construct a multiple-antenna model according to the simulation parameters. In one embodiment, the simulation parameters may include a total number of antennas to be constructed, and a length of each of the constructed antennas. As mentioned, the multiple-antenna model may include multiple antennas, such as one or more receiver antennas, and one or more transmission antennas. In one example with respect to FIG. 3, the multiple-antenna model 10 may include two antennas, such as a first antenna and a second antenna. In FIG. 3A, the first antenna and the second antenna are arranged horizontally in multiple-antenna model 10. In FIG. 3B, the first antenna and the second antenna are arranged vertically in multiple-antenna model 10.

The antenna simulation module 21 is further operable to simulate an electromagnetic field of the multiple-antenna model in a 3D coordinate system, and obtain an electromagnetic power of each of the constructed antennas from the multiple-antenna model. In one embodiment, each of the antennas has an electromagnetic power to simulate the electromagnetic field of the multiple-antenna model.

The correlation degree calculation module 22 is operable to generate a power azimuth spectrum of each of the constructed antennas in an X-Y coordinate system according to the electromagnetic power of the constructed antenna, and calculate a correlation degree of each of the constructed antennas according to the power azimuth spectrum of the constructed antenna. The power azimuth spectrum is used to represent an electromagnetic power frequency of each of the constructed antennas in the multiple-antenna model. In one embodiment, the power azimuth spectrum can be represented by a frequency probability distribution, such as a normal distribution, a Gaussian distribution, or a Rayleigh distribution, for example.

The MIMO antenna system generation module 23 is operable to generate a MIMO antenna system according to the electromagnetic field of the multiple-antenna model and the correlation degree of each of the constructed antennas. In one embodiment, the MIMO antenna system may be represented by a simulation algorithm such as:

normal distribution RV(N, M)+j*normal distribution RV(N, M))/√2, where N and M represent a number of each of the antennas, RV(N, M) represents a random variable value of N and M, and j represents multiplication times of the RV(N, M).

The MIMO antenna system evaluation module 24 is operable to encode a series of radio frequency (RF) signals via a digital encoder when the RF signals are received by the MIMO antenna system, and modulate each of the encoded RF signals to generate a frequency modulation (FM) signal. In one embodiment, the digital encoder may be an alamouti space-time block encoder. The MIMO antenna system evaluation module 24 is further operable to input the FM signals to the MIMO antenna system, and transmit the FM signals through the MIMO antenna system.

The MIMO antenna system evaluation module 24 is further operable to decode each of the FM signals to generate a decoded FM signal after the FM signal is output from the MIMO antenna system, and demodulate the decoded FM signals to recover the RF signals. In addition, the MIMO antenna system evaluation module 24 is operable to analyze a bit error rate of the RF signals based on the recovery RF signals, evaluate the performance of the MIMO antenna system according to the bit error rate of the RF signals, and display a performance analysis result of the MIMO antenna system on the display device 3.

Figure 2:
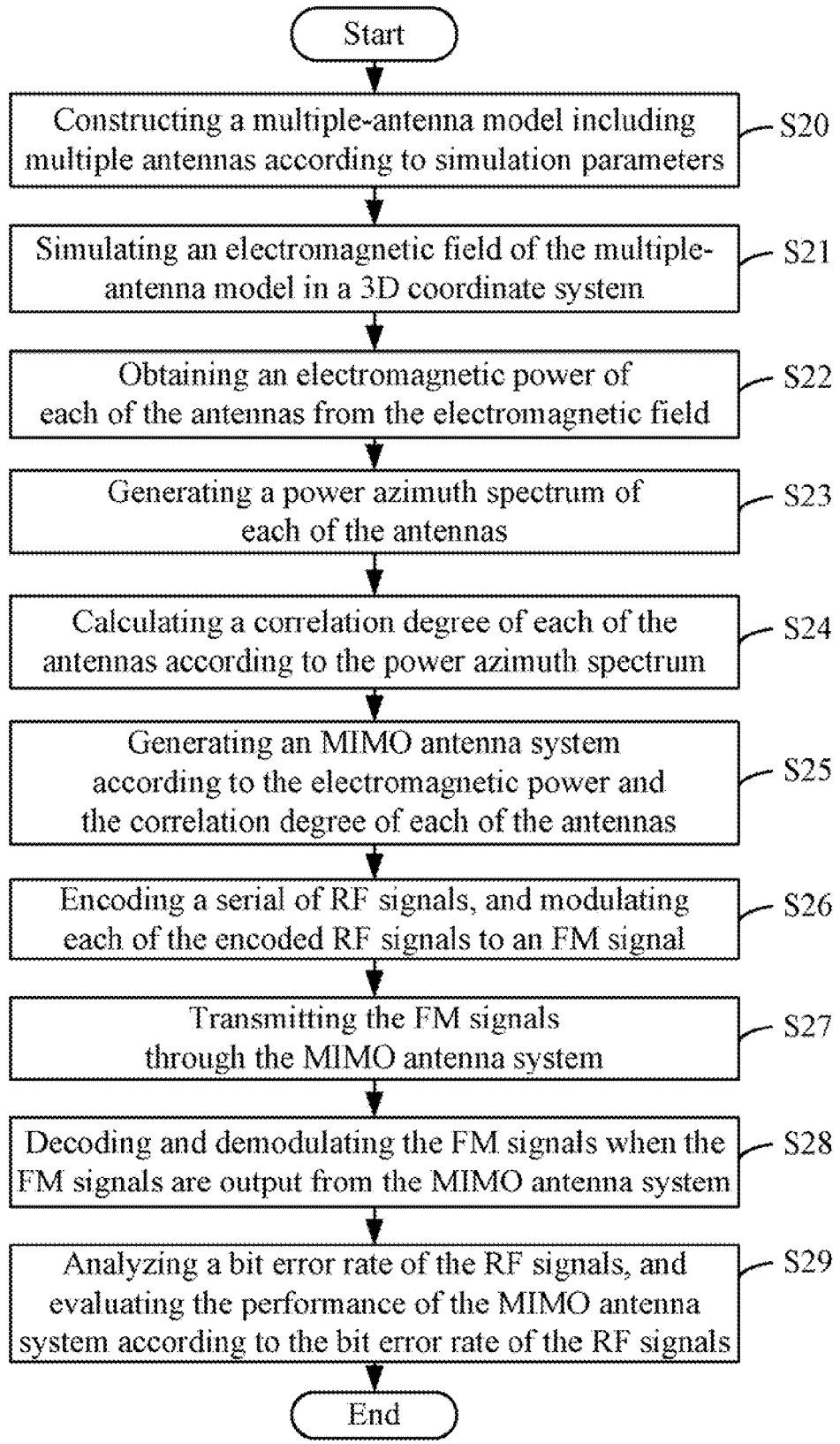
FIG. 2 is a flowchart of one embodiment of a performance evaluation method for a MIMO antenna system using a system such as, for example, that of FIG. 1.

FIG. 2 is a flowchart of one embodiment of a method for evaluating performance of a MIMO antenna system using a system such as, for example, that of FIG. 1. Depending on the embodiment, additional blocks may be added, others removed, and the ordering of the blocks may be changed.

In block S20, the antenna simulation module 21 receives a plurality of simulation parameters input from the input device 1, and constructs a multiple-antenna model according to the simulation parameters. In one embodiment, the simulation parameters may include a total number of antennas to be constructed, and a length of each of the constructed antennas. The multiple-antenna model may include multiple antennas, such as one or more receiver antennas, and one or more transmission antennas. In one example with respect to FIG. 3, the multiple-antenna model 10 may include two antennas, such as a first antenna and a second antenna, for example. In FIG. 3A, the first antenna and the second antenna are arranged horizontally in the multiple-antenna model 10. In FIG. 3B, the first antenna and the second antenna are arranged vertically in the multiple-antenna model 10.

In block S21, the antenna simulation module 21 simulates an electromagnetic field of the multiple-antenna model in a 3D coordinate system. In one embodiment, each of the antennas provides electromagnetic power to simulate the electromagnetic field of the multiple-antenna model. In block S22, the antenna simulation module 21 obtains the electromagnetic power of each of the antennas from the multiple-antenna model. In one example with respect to FIG. 3A-3B, the antenna simulation module 21 obtains an electromagnetic power of each antenna in an X-axis denoted as "$E_\theta$", and obtains an electromagnetic power of each antenna in a Y-axis denoted as "$E_\phi$". Here, "E" represents an electromagnetic power of each antenna, "θ" represents a angle that is derived from the X-axis of the coordinate system, and "φ" represents a angle that is derived from the Y-axis of the coordinate system.

Figure 4A:
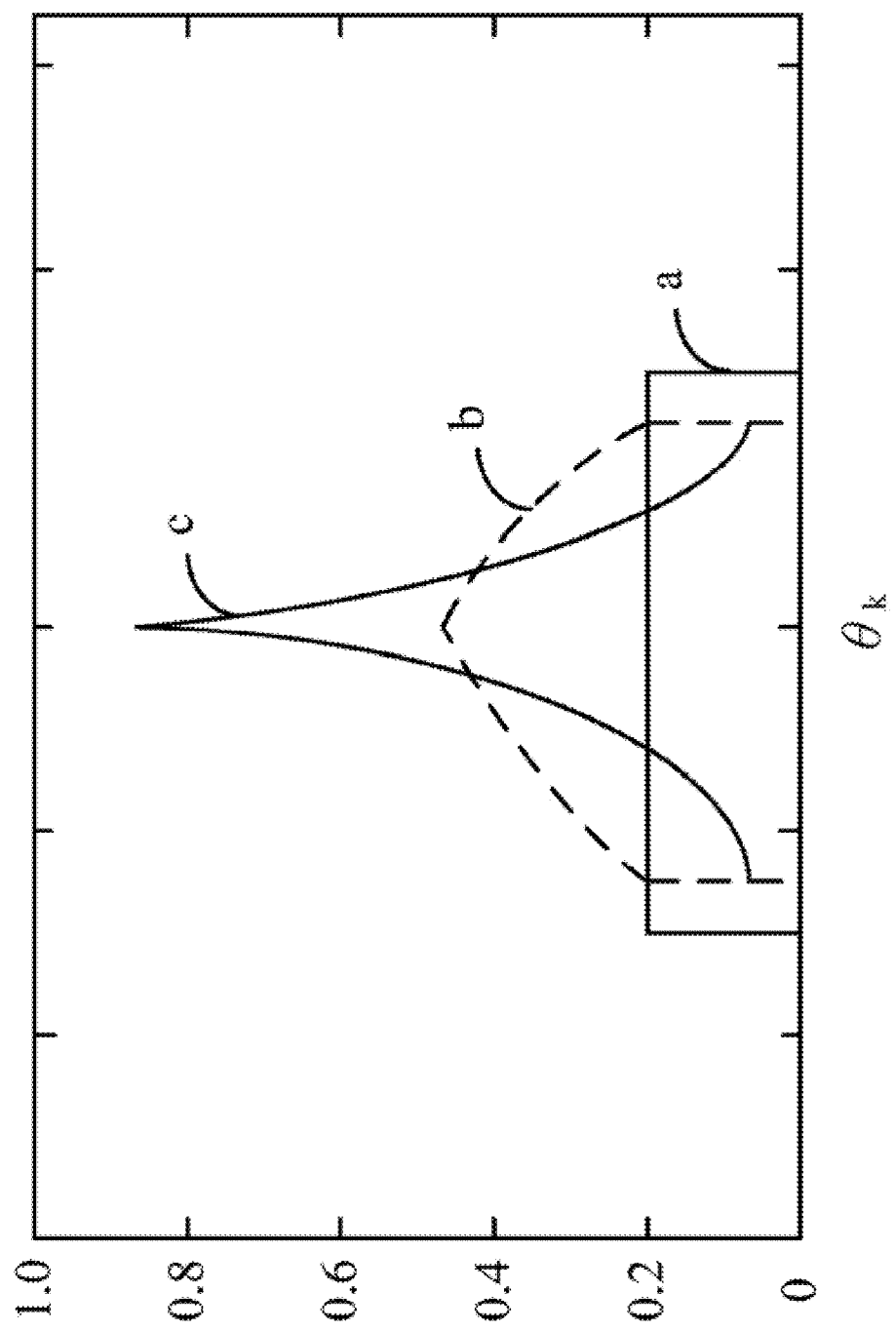
FIG. 4A-4B are schematic diagrams illustrating a power azimuth spectrum represented by different frequency probability distributions.
Figure 4B:
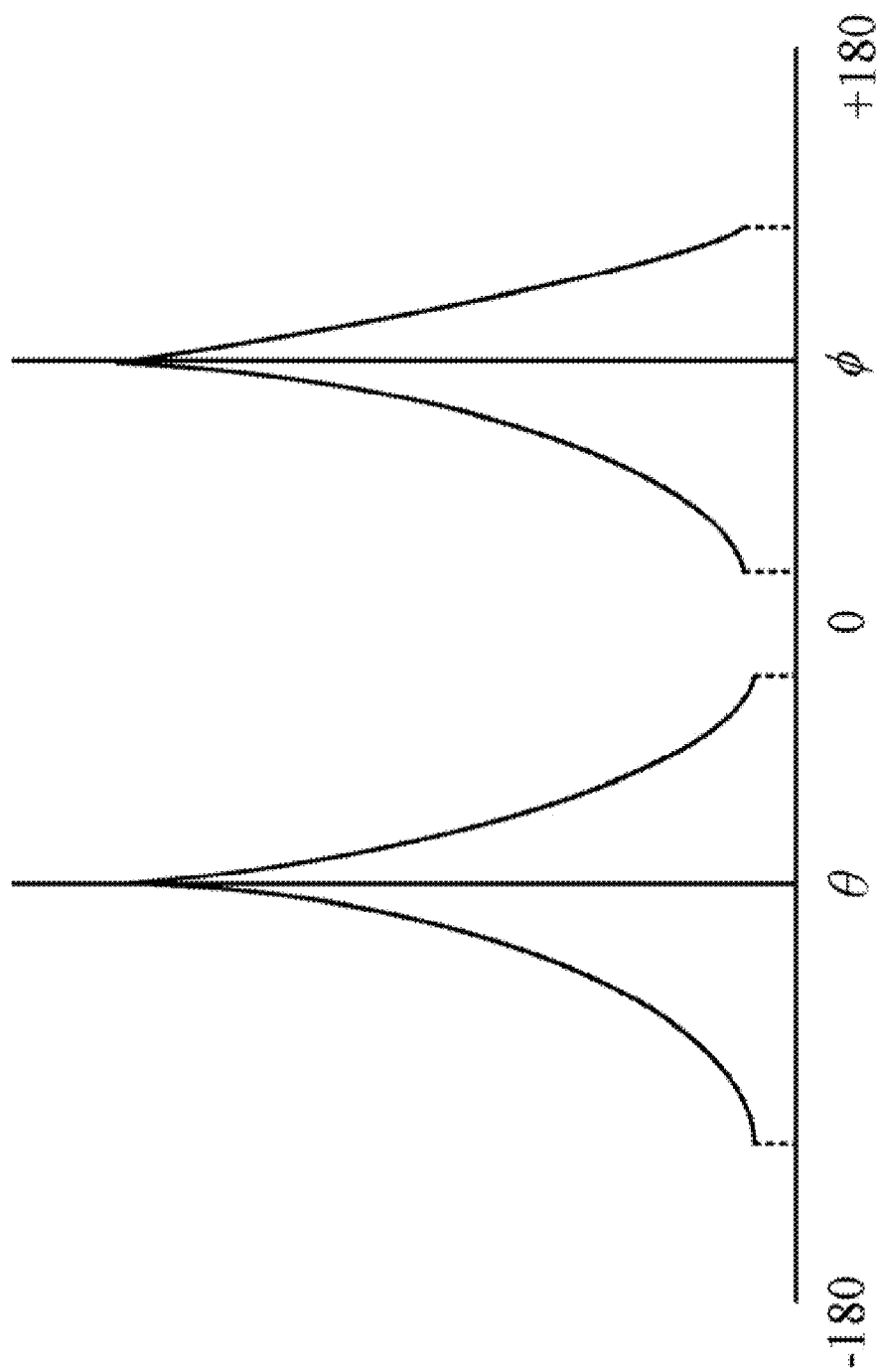

In block S23, the correlation degree calculation module 22 generates a power azimuth spectrum of each of the constructed antennas in an X-Y coordinate system according to the electromagnetic power of the constructed antenna. The power azimuth spectrum is used to represent an electromagnetic power frequency of each of the constructed antennas in the multiple-antenna model. In one embodiment, the power azimuth spectrum can be represented by a frequency probability distribution, such as a normal distribution, a Gaussian distribution, or a Rayleigh distribution, for example. In one example with respect to FIG. 4A, a power azimuth spectrum "a" is represented by the normal distribution, a power azimuth spectrum "b" is represented by the Gaussian distribution, and a power azimuth spectrum "c" is represented by the Rayleigh distribution. In another example with respect to FIG. 4B, the power azimuth spectrum can be represented in different angles that are derived from the X-Y coordinate system, such as the angle "θ" and the angle "φ", for example.

In block S24, the correlation degree calculation module 22 calculates a correlation degree of each of the constructed antennas according to the power azimuth spectrum of the constructed antenna. In block S25, the MIMO antenna system generation module 23 generates a MIMO antenna system according to the electromagnetic field of the multiple-antenna model and the correlation degree of each of the constructed antennas. In one embodiment, the MIMO antenna system may be represented by a simulation algorithm such as:

normal distribution RV(N, M)+j*normal distribution RV(N, M))/√2, where N and M represent a number of each of the antennas, RV(N, M) represents a random variable value of N and M, and j represents a multiplication times of the RV(N, M).

Figure 5:
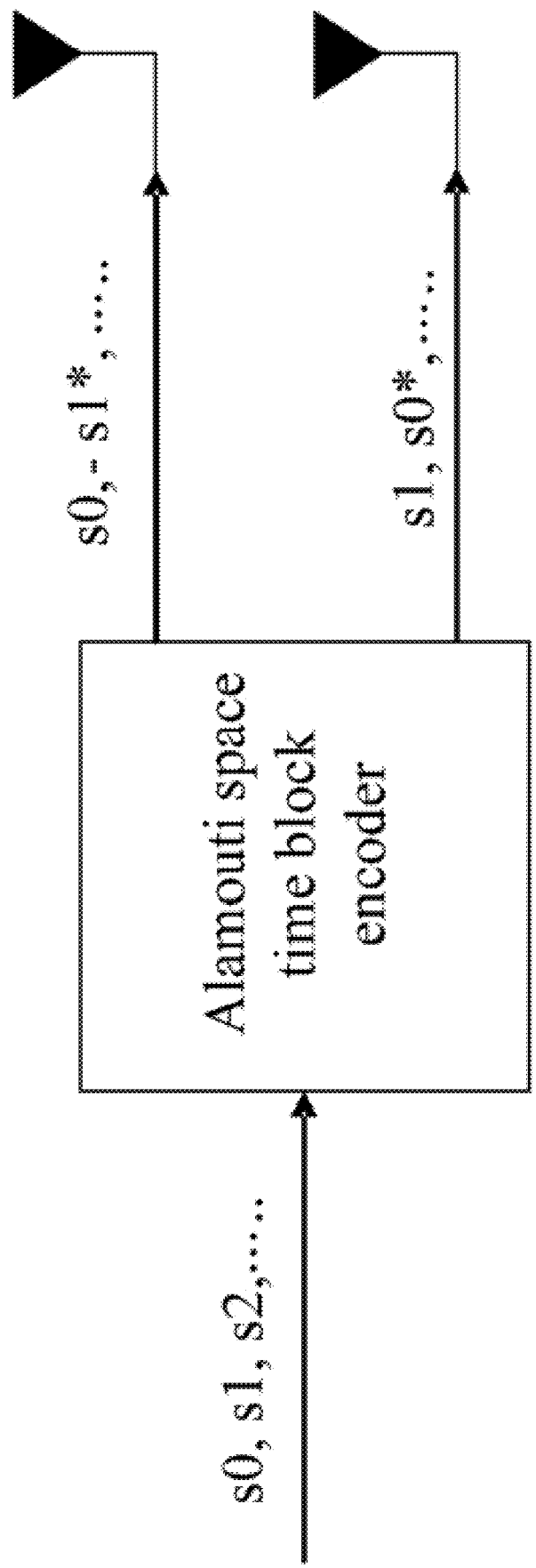
FIG. 5 is a schematic diagram illustrating an example of encoding and modulating RF signals using an alamouti space-time block encoder before the RF signals are transmitted through the MIMO antenna system.

In block S26, the MIMO antenna system evaluation module 24 encodes a series of radio frequency (RF) signals via a digital encoder when the FR signals are received by the MIMO antenna system, and modulates each of the encoded FR signals to generate a frequency modulation (FM) signal. In one embodiment, the digital encoder may be an alamouti space-time block encoder. In one example with respect to FIG. 5, a series of FR signals "$S_0, S_1, S_2, \ldots$" are encoded by the alamouti space-time block encoder, and then modulated to generate a first group of FM signals "s0, −s1*, . . . ," and a second group of FM signals "s1, s0*, . . . ".

Figure 6:
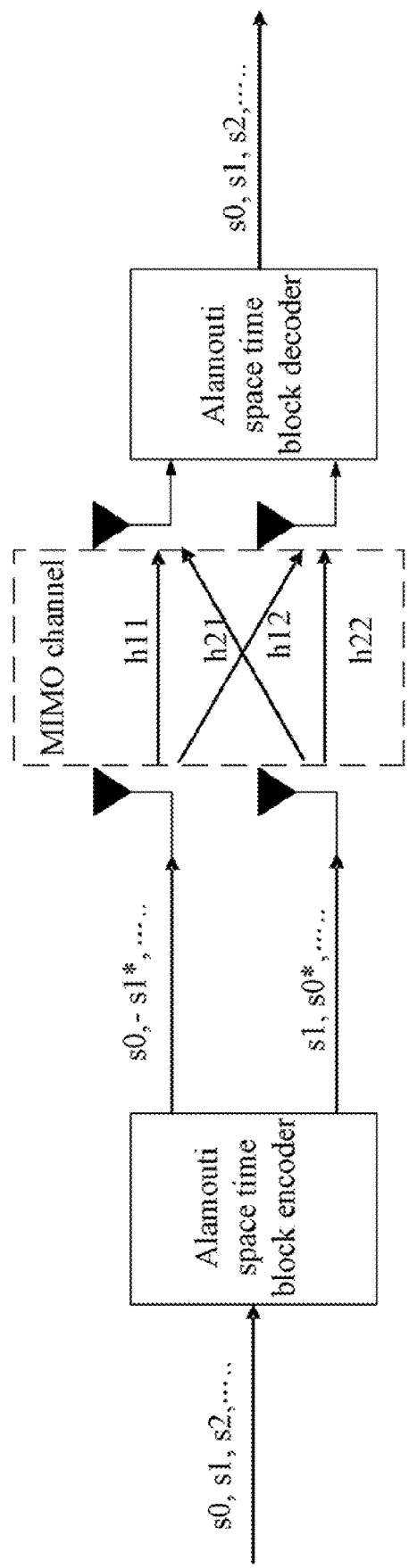
FIG. 6 is a schematic diagram illustrating an example of decoding and demodulating RF signals using an alamouti space-time block encoder after the RF signals are output from the MIMO antenna system.

In block S27, the MIMO antenna system evaluation module 24 inputs the FM signals to the MIMO antenna system, and transmits the FM signals through the MIMO antenna system. In block S28, the MIMO antenna system evaluation module 24 decodes each of the FM signals to generate a decoded FM signal after the FM signals are output from the MIMO antenna system, and demodulates each of the decoded FM signals to recover the RF signals. In one example with respect to FIG. 6, the first group of FM signals "s0, −s1*, . . . " and the second group of FM signals "s1, s0*, . . . " are transmitted in different MIMO channels of the MIMO antennas system, such as $h_{11}, h_{12}, h_{21}$, and $h_{22}$, for example. The MIMO antenna system evaluation module 24 decodes and demodulates the first and second group of FM signals to recover the series of FR signals "$S_0, S_1, S_2, \ldots$" after the first second group of FM signals are output from the different MIMO channels of the MIMO antennas system.

In block S29, the MIMO antenna system evaluation module 24 analyzes a bit error rate of the recovery RF signals, and evaluates the performance of the MIMO antenna system according to the bit error rate of the recovery RF signals. The MIMO antenna system evaluation module 24 further displays a performance analysis result of the MIMO antenna system on the display device 3 for a designer to evaluate the performance of the MIMO antenna system.

All of the processes described above may be embodied in, and fully automated via, functional code modules executed by one or more general purpose processors of computing devices. The functional code modules may be stored in any type of readable medium or other storage devices. Some or all of the methods may alternatively be embodied in specialized computer hardware.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A performance evaluation system for a multiple-input multiple-output (MIMO) antenna system, the performance evaluation system comprising:
    an antenna simulation module operable to receive a plurality of simulation parameters from an input device, construct a multiple-antenna model according to the simulation parameters, simulate an electromagnetic field of the multiple-antenna model in a 3D coordinate system, and obtain an electromagnetic power of each of the constructed antennas from the multiple-antenna model;
    a correlation degree calculation module operable to generate a power azimuth spectrum of each of the constructed antennas in an X-Y coordinate system according to the electromagnetic power of the constructed antenna, and calculate a correlation degree of each of the constructed antennas according to the power azimuth spectrum of the constructed antenna;
    an MIMO antenna system generation module operable to generate a MIMO antenna system according to the electromagnetic field of the multiple-antenna model and the correlation degree of each of the constructed antennas; and
    an MIMO antenna system evaluation module operable to transmit a series of radio frequency (RF) signals through the MIMO antenna system, evaluate performance of the MIMO antenna system based on the transmitted RF signals, and display a performance analysis result of the MIMO antenna system on a display device.

2. The performance evaluation system according to claim 1, wherein the MIMO antenna system evaluation module is further operable to encode the RF signals via a digital encoder before the FR signals are transmitted through the MIMO antenna system, and modulate each of the encoded FR signals to generate a frequency modulation (FM) signal.

3. The performance evaluation system according to claim 2, wherein the MIMO antenna system evaluation module is further operable to decode each of the FM signals to generate a decoded FM signal after the FM signal is output from the MIMO antenna system, and demodulate the decoded FM signals to recover the RF signals.

4. The performance evaluation system according to claim 2, wherein the digital encoder is an alamouti space-time block encoder.

5. The performance evaluation system according to claim 1, wherein the MIMO antenna system evaluation module evaluates the performance of the MIMO antenna system by analyzing a bit error rate of the RF signals after the RF signals output from the MIMO antenna system.

6. The performance evaluation system according to claim 1, wherein the simulation parameters comprise a total number of antennas to be constructed, and a length of each of the constructed antennas.

7. The performance evaluation system according to claim 1, wherein the power azimuth spectrum is represented by a normal distribution, a Gaussian distribution, or a Rayleigh distribution.

8. A computer-enabled method for evaluating performance of a multiple-input multiple-output (MIMO) antenna system, the method comprising:
    receiving a plurality of simulation parameters from an input device;
    constructing a multiple-antenna model according to the simulation parameters;
    simulating an electromagnetic field of the multiple-antenna model in a 3D coordinate system, and obtaining an electromagnetic power of each of the constructed antennas from the multiple-antenna model;
    generating a power azimuth spectrum of each of the constructed antennas in an X-Y coordinate system according to the electromagnetic power of the constructed antenna;
    calculating a correlation degree of each of the constructed antennas according to the power azimuth spectrum of the constructed antenna;
    generating a MIMO antenna system according to the electromagnetic field of the multiple-antenna model and the correlation degree of each of the constructed antennas;
    transmitting a series of radio frequency (RF) signals through the MIMO antenna system;
    evaluating the performance of the MIMO antenna system based on the transmitted RF signals; and
    displaying a performance analysis result of the MIMO antenna system on a display device.

9. The method according to claim 8, further comprising:
    encoding the RF signals via a digital encoder before the FR signals are transmitted through the MIMO antenna system;
    modulating each of the encoded FR signals to generate a frequency modulation (FM) signal;
    decoding each of the FM signals to generate a decoded FM signal after the FM signal is output from the MIMO antenna system; and
    demodulating the decoded FM signals to recover the RF signals.

10. The method according to claim 9, wherein the digital encoder is an alamouti space-time block encoder.

11. The method according to claim 8, further comprising:
    analyzing a bit error rate of the RF signals after the RF signals output from the MIMO antenna system; and
    evaluating the performance of the MIMO antenna system according to the bit error rate of the RF signals.

12. The method according to claim 8, wherein the simulation parameters comprise a total number of antennas to be constructed, and a length of each of the constructed antennas.

13. The method according to claim 8, wherein the power azimuth spectrum is represented by a normal distribution, a Gaussian distribution, or a Rayleigh distribution.

14. A storage medium having stored thereon instructions that, when executed by a processor of a computing device, cause the computing device to perform a method for evaluating performance of a multiple-input multiple-output (MIMO) antenna system, the method comprising:
    receiving a plurality of simulation parameters from an input device;

constructing a multiple-antenna model according to the simulation parameters;

simulating an electromagnetic field of the multiple-antenna model in a 3D coordinate system, and obtaining an electromagnetic power of each of the constructed antennas from the multiple-antenna model;

generating a power azimuth spectrum of each of the constructed antennas in an X-Y coordinate system according to the electromagnetic power of the constructed antenna;

calculating a correlation degree of each of the constructed antennas according to the power azimuth spectrum of the constructed antenna;

generating a MIMO antenna system according to the electromagnetic field of the multiple-antenna model and the correlation degree of each of the constructed antennas;

transmitting a series of radio frequency (RF) signals through the MIMO antenna system;

evaluating the performance of the MIMO antenna system based on the transmitted RF signals; and displaying a performance analysis result of the MIMO antenna system on a display device.

15. The storage medium according to claim 14, wherein the method further comprises:

encoding the RF signals via a digital encoder before the FR signals are transmitted through the MIMO antenna system;

modulating each of the encoded FR signals to generate a frequency modulation (FM) signal;

decoding each of the FM signals to generate a decoded FM signal after the FM signal is output from the MIMO antenna system; and demodulating the decoded FM signals to recover the RF signals.

16. The storage medium according to claim 15, wherein the digital encoder is an alamouti space-time block encoder.

17. The storage medium according to claim 14, wherein the method further comprises:

analyzing a bit error rate of the RF signals after the RF signals output from the MIMO antenna system; and evaluating the performance of the MIMO antenna system according to the bit error rate of the RF signals.

18. The storage medium according to claim 14, wherein the simulation parameters comprise a total number of antennas to be constructed, and a length of each of the constructed antennas.

19. The storage medium according to claim 14, wherein the power azimuth spectrum is represented by a normal distribution, a Gaussian distribution, or a Rayleigh distribution.

\* \* \* \* \*